May 19, 1953

D. H. RING

2,639,326

ELECTROMAGNETIC WAVE MICROWAVE FREQUENCY
STRUCTURE USING HYBRID JUNCTIONS

Filed March 6, 1951

INVENTOR
*D. H. RING*
BY
*H. O. Wright*
ATTORNEY

INVENTOR
D. H. RING
BY
H. O. Wright
ATTORNEY

Patented May 19, 1953

2,639,326

UNITED STATES PATENT OFFICE 2,639,326

ELECTROMAGNETIC WAVE MICROWAVE FREQUENCY STRUCTURE USING HYBRID JUNCTIONS

Douglas H. Ring, Red Bank, N. J., assignor to Bell Telephone Laboratories, Incorporated, New York, N. Y., a corporation of New York Application March 6, 1951, Serial No. 214,061

20 Claims. (Cl. 178—44)

This invention relates to electromagnetic wave, microwave frequency, or "guided wave frequency range" transmission apparatus. More particularly, it relates to novel methods of and arrangements for determining the frequency selectivity and improving the attenuation and delay characteristics of such apparatus. Devices of the invention include "guided wave frequency range" delay or phase equalizing structures, amplitude equalizing structures and frequency selecting or filtering structures.

While the particular illustrative embodiments employed in connection with the following detailed descriptive material are high frequency coaxial or wave-guide structures, it will be immediately apparent to those skilled in the art that analogous low frequency combinations of ordinary hybrid coils with two wire loop circuits including low frequency attenuators and phase shifters can readily be constructed in accordance with the principles of the invention and will provide corresponding characteristics in the low frequency regions. Full and complete exploitation of the microwave or guided wave frequency range or spectrum, (i. e. the frequency region extending from about 30 megacycles upwards) can be realized only when adequate frequency selective and equalizing devices of convenient and readily realizable character are made available and have been demonstrated feasible.

The "guided wave frequency range" is to be understood, for the purposes of this application and in the appended claims, to be that range of frequencies of electromagnetic waves in which either coaxial transmission lines or single conductor "wave-guide" transmission lines or combinations of these two types of transmission lines are, conveniently, employed. This range extends from about 30 megacycles upward to the highest frequencies which can at present be employed in electrical systems.

This application is a continuation in part of my copending application Serial No. 68,361 filed December 30, 1948. The pertinent portions of the disclosure of said copending application are hereby incorporated in and made a part of the present application by reference.

The principal objects of this invention are to provide convenient and practicable novel frequency selective and equalizing devices for use in electromagnetic wave "guided wave frequency range" transmission systems.

Other objects of the invention are to provide novel structures comprising combinations of wave-guide or coaxial line devices and structures associated and arranged to constitute wave filters, phase equalizers and attenuation equalizers at very high frequencies.

Other and further objects will become apparent during the course of the description of specific illustrative structures given hereinafter and from the appended claims.

Since the practicable realization of sources of adequate electromagnetic wave, microwave frequency, radio energy, (i. e., radio energy having frequencies from about 1,000 megacycles upward) it has become imperative to find very high frequency equivalents of the lumped element types of frequency selective circuits and amplitude equalizing and delay equalizing devices commonly employed at lower frequencies.

The lumped element circuits and devices, of course, comprise various combinations of discrete inductive, capacitative and resistive elements, proportioned and arranged in accordance with well-known, highly developed, coordinated and systematized principles. By way of illustration, many of these principles are summarized and briefly discussed in the "Radio Engineers Handbook" by F. E. Terman, first edition, McGraw-Hill Book Company, Incorporated, New York City, 1943, pages 197 to 251, inclusive. The main authoritative publications in this art are referred to in Terman's above-mentioned Handbook.

In the case of the present invention various novel electromagnetic wave, microwave or guided wave frequency range, structures are disclosed which are strikingly different in physical appearance and mechanical structure from the approximately equivalent lower frequency lumped element structures. A general discussion of the relations of devices of the invention to prior art structures is given in my above-mentioned copending parent application.

The nature and principles of the invention will be more readily understood in connection with the following detailed description of specific illustrative arrangements and from the accompanying drawings, in which.

Figure 1:
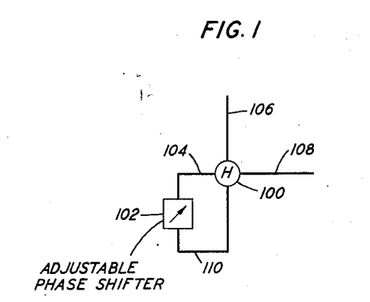
Fig. 1 shows, in electrical block schematic diagram form, the combination of an electromagnetic wave, guided wave frequency range, hybrid structure with a single reactive element which can readily be proportioned to provide, at microwave frequencies, phase delay characteristics appropriate for use in electromagnetic wave, guided wave frequency range systems.

In more detail, in Fig. 1 a structure of the invention is shown in block schematic diagram form. This structure includes a wave-guide or coaxial hybrid structure H, designated 100. A terminal of one conjugate pair is connected to a terminal of the other conjugate pair of hybrid structure 100, by the circuit including lines 104 and 110 (wave guide or coaxial) and reactive device 102.

Device 100 of Fig. 1 can be a "magic T" type, electromagnetic wave, wave-guide hybrid junction similar to junction 600 of Fig. 6, of the drawings accompanying my above-mentioned, copending, parent application, in which case its terminals can correspond to terminals 602, 608, 604 and 606, respectively, of the said junction 600 of my parent application. As is well known to those skilled in the art the E and H arms of a "magic T" hybrid junction comprise one conjugately related pair of terminals and the other two arms comprise a second pair of conjugately related terminals. In the four terminal hybrid ring type of junction whether of wave guide, coaxial line, or simple two wire transmission line, alternate terminals are conjugately related. For example, in the hybrid ring junction 800 of Fig. 8 terminals 802 and 808 comprise one conjugately related pair and terminals 804 and 806 comprise a second conjugately related pair.

Alternatively, the hybrid structure of Fig. 1 can be an electromagnetic wave, wave-guide ring hybrid junction similar to junction 700 of Fig. 7, of the drawings accompanying my above-mentioned, copending, parent application, in which case its vertical terminals can correspond to either terminals 702 and 708, respectively, or to terminals 704 and 706, respectively, of junction 700 of my parent application; the horizontal terminals of the Fig. 1 junction 100 of the present application then corresponding to those of the other pair of terminals of the said junction 700 of Fig. 7 of said parent application.

As a further alternative, junction 100 can be of the coaxial ring type as illustrated by junction 800, 801 of Fig. 8 of the drawings accompanying my above-mentioned, copending, parent application, and the terminals of junction 100 of the present application, can then correspond to terminals 802, 803; 808, 809; 804, 805 and 806, 807, respectively, of said Fig. 8 of my parent application.

In each and every case, the loop circuit including lines 104 and 110, is connected between one terminal of one conjugate pair and one terminal of the other conjugate pair of hybrid junction terminals, the free terminal of one conjugate pair being then the input terminal for the over-all circuit and the free terminal of the other conjugate pair then being the output terminal for the over-all circuit.

Figure 5:
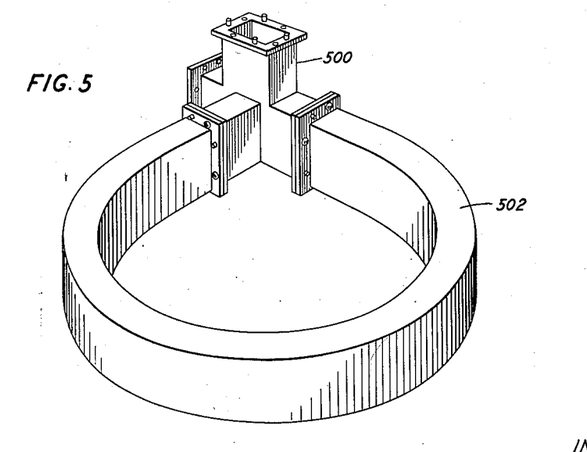
Figs. 5 to 10, inclusive, represent assemblies of actual wave-guide or coaxial structure embodying the principles explained in connection with the block schematic diagrams of Figs. 1 to 4, inclusive.

When the hybrid junction is an electromagnetic wave-guide structure of either the "magic T" or wave-guide ring type, the "loop circuit" can comprise simply a length of wave guide with portions thereof curved appropriately as illustrated in Fig. 5, for example, and as described in detail hereinafter.

When the hybrid junction is a coaxial ring structure, such as ring 800, 801 of Fig. 8, of the drawings accompanying my above-mentioned copending, parent application, a loop of coaxial line can be employed to connect the appropriate two terminals together.

For more convenient adjustment, for purposes, a number of which will be described in detail below, the loop of transmission line joining the terminals as shown in Fig. 1, or the equivalent terminals of other junctions as above-described, can include an adjustable phase shifting device 102, in which case two portions of transmission line 104 and 110 are used to complete the "loop."

Figure 2:
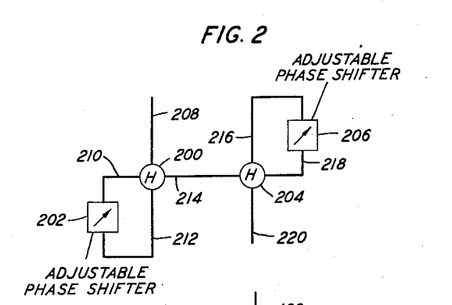
Fig. 2 shows a combination of two arrangements of the type shown in Fig. 1 connected in tandem or sequence.
Figure 4:
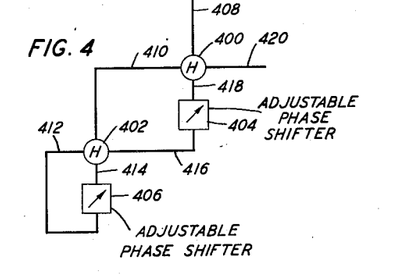
Fig. 4 shows an alternative way of utilizing two devices of the type shown in Fig. 1.

Figs. 2 and 4 illustrate, in block diagrammatic form, two methods of connecting two structures of the type illustrated in Fig. 1 in tandem or cascade relation.

In Fig. 2 two devices of the type illustrated by Fig. 1 are connected directly in tandem or cascade relation. The first of these comprises hybrid junction 200, corresponding to junction 100 of Fig. 1, and a loop comprising an adjustable phase shifter 202 connected to one terminal of the junction by transmission line 210 and to a second terminal of the junction by transmission line 212, as shown. The second device in Fig. 2 of the type illustrated in Fig. 1 comprises hybrid junction 204 and a loop comprising an adjustable phase shifter 206 connected to one terminal of the junction by transmission line 216 and to a second terminal of the junction by transmission line 218. Finally, the output terminal of the first device is connected to the input terminal of the second device by transmission line 214. The input terminal 208 of the first device and the output terminal 220 of the second device, then become the input and output terminals, respectively, of the over-all combination of Fig. 2. The utility of combinations of the type shown in Fig. 2 will be indicated hereinafter.

The circuit arrangement of Fig. 4 is equivalent in its over-all possible electrical characteristics to that of Fig. 2. It differs from the arrangement of Fig. 2, obviously, in that the second structure, comprising hybrid junction 402, two terminals of which are connected by loop circuit comprising adjustable phase shifter 406 and transmission lines 412 and 414, is connected directly in the "loop circuit" of the first structure so that the input circuit 408 and output circuit 420 of the first structure are also the input and output circuits, respectively, of the over-all structure. The first structure comprises hybrid junction 400, two terminals of which are connected by a loop circuit which comprises adjustable phase shifter 404, transmission line 418 connecting the phase shifter 404 to one terminal of junction 400, transmission line 416 connecting phase shifter 404 to one terminal of junction 402, the junction 402 with its associated loop as described in detail above, and transmission line 410 connecting a second terminal of junction 402 to a second terminal of junction 400, as illustrated in Fig. 4.

Figure 3:
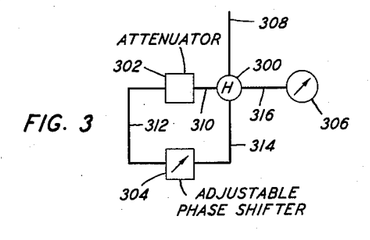
Fig. 3 shows a structure of the general type illustrated in Fig. 1 rearranged to provide a frequency indicating circuit.

The circuit arrangement of Fig. 3 is similar to that of Fig. 1 except that the loop circuit of Fig. 3 includes an attenuator 302 as well as an adjustable phase shifter 304 and an indicator 306 connected to the output terminal of hybrid junction 300. The "loop circuit" of the arrangement of Fig. 3 comprises as shown, in addition to attenuator 302 and phase shifter 304, a transmission line 310 connecting a first terminal of junction 300 to attenuator 302, a transmission line 312 connecting attenuator 302 to phase shifter 304 and a transmission line 314 connecting phase shifter 304 to a second terminal of junction 300. Various uses to which the arrangement of Fig. 3 can be put will be described in detail below.

In its simplest form the "loop circuit" connecting the terminals of Fig. 1 as described above, can comprise a loop of wave guide (or of coaxial line, depending upon and corresponding to the structure of which the junction being employed is made) and the over-all combination of Fig. 1 then becomes a phase equalizer the properties of which are mathematically derived in the following manner:

$$E_3 = \frac{E_1}{\sqrt{2}} - \frac{E_2}{\sqrt{2}} \quad (1)$$

$$E_4 = \frac{E_1}{\sqrt{2}} + \frac{E_2}{\sqrt{2}} \quad (2)$$

where $E_1$ is the input voltage across the upper terminal (line 106); $E_2$ is the voltage across the lower terminal (right end of line 110); $E_3$ is the voltage across the left terminal (right end of line 104); and $E_4$ is the output voltage across the right terminal (left end of line 108).

Let $$E_2 = nE_3 \quad (3)$$

where $n = N|\theta$
$N$ = ratio of the magnitude of $E_3$ to $E_2$
$\theta$ = electrical length of the "loop circuit" between the left and lower terminals in radians =

$$\frac{2\pi l f}{v}$$

where
$l$ = length of line
$v$ = velocity
$f$ = frequency
then $$\frac{E_4}{E_1} = \frac{n\sqrt{2}+1}{\sqrt{2}+n}$$

$$= \frac{\sqrt{2}(1+N^2)+3N\cos\theta+j\sin\theta}{2+N^2+2N\sqrt{2}\cos\theta} \quad (4)$$

If $N$ is unity, i. e., if the loss is substantially zero, the magnitude of $$\frac{E_4}{E_1}$$

is also unity for all values of $\theta$, and $$\frac{E_4}{E_1} = 1|\alpha = \frac{2\sqrt{2}+3\cos\theta+j\sin\theta}{3+2\sqrt{2}\cos\theta} \quad (5)$$

$$\tan^{-1}\alpha = \frac{\sin\theta}{2\sqrt{2}+3\cos\theta} \quad (6)$$

In a phase equalizer we are interested in the variation in the phase shift of the device, $\alpha$, as a function of frequency. Over the band of interest $\theta$ is proportional to frequency and $\alpha$ as a function of frequency can be determined from (6).

In many problems phase equalizers are specified in terms of their delay characteristics. The delay is defined as the rate of change of phase with respect to $2\pi f$.

$$T = \frac{d\alpha}{d\omega}$$

Taking $$\theta = \frac{2\pi l f}{c}$$

$T$ can be calculated by differentiating Equation 6.

$$T = \frac{l}{c}\left[3 - 2\sqrt{2}\left(\frac{2\sqrt{2}+3\cos\theta}{3+2\sqrt{2}\cos\theta}\right)\right] \quad (7)$$

When $\cos\theta = 1$, $T = 0.172\dfrac{l}{c}$

When $\cos\theta = -1$, $T = 5.83\dfrac{l}{c}$

The curve 402 of Fig. 4 of my above-mentioned copending parent application, by way of example, is a plot of the more central portion of the curve resulting from a plot of Equation 7 for a particular delay equalizer and shows the delay $T$ as a function of frequency over a frequency range in which $\cos\theta$ varies from about 0 through $-1$ and back to 0. The maximum delay occurs at $f_0$ which is the frequency for which $\cos\theta = -1$. Equation 7 applies to the case where the path including line 104, device 102 and line 110 of Fig. 1, is replaced by an air dielectric transmission line with a group velocity equal to that of light. If the path is a wave guide and associated apparatus as illustrated schematically in Fig. 1, having a different group velocity (or if it is a loaded coaxial line and associated apparatus) then $l$ in Equation 7 must be the equivalent electrical length of the path or loop circuit, rather than the physical length of the connecting line, and Equation 7 will then become an approximate formula, but is still close enough for practical use.

If we define $$Q = \frac{f_0}{2\Delta f}$$

where $2\Delta f$ is the bandwidth between the frequencies at which $T$ has one-half its maximum value, then $$Q = \frac{5.83 l \pi f_0}{2C} = \frac{9.15 l f_0}{C}$$

$$2\Delta f = \frac{C}{9.15 l} \quad (8)$$

It is apparent from Equation 7 that at high frequencies small changes in $l$ serve to adjust the peak of the delay characteristic to a particular $f_0$, while it can be seen from Equation 8 that regardless of $f_0$ the bandwidth of the device is a function of the gross length of the line.

The results obtained with a structure of the general type exemplified by Fig. 1 are, of course, substantially identical with those which can be obtained by properly designed structures of the general types represented by Figs. 5, 9 or 11 of my above-mentioned, copending parent application. A structure of Fig. 1 of the present application, obviously, however, has the advantage of greater simplicity and fewer structural elements.

The curve 402 of Fig. 4 of my copending parent application is similar to the amplitude curve of a tuned circuit. This suggests the possibility of using two or more of the equalizers of the types illustrated in Figs. 10 and 12 of my copending parent application and Fig. 1 of the present application, for example, to produce arbitrarily shaped delay curves in much the same way that staggered tuned circuits are used to produce arbitrary amplitude response curves. This can be done without difficulty since these equalizers are constant resistance devices which do not depend upon reflections and are therefore matched at all frequencies and can be connected in tandem without interaction.

Fig. 2, as described above, shows two equalizers of the type of Fig. 1 connected in tandem. Phase shifters 202 and 206 have been included in the respective loop circuits of these equalizers as shown. These phase shifters can each consist of a tapered dielectric or metal vane arranged to move in from the side of a wave guide in the manner shown in Fig. 1 of applicant's copending application Serial No. 640,495, now abandoned, filed January 11, 1946. Alternatively, the phase shifters 202 and 206 can be of either of the forms shown in Fig. 2 and 3 of my copending application Serial No. 640,495, now abandoned.

The phase shifters can obviously be used to adjust $\theta$ or $f_0$ without the need for changing the physical length of the line. This greatly eases the problem of adjustment of the equalizer to operate at a given frequency. The gross length of the lines can then be determined on the basis of the desired band-width alone and $f_0$ controlled by the phase shifter (or shifters).

An analysis of the operation of the phase or delay equalizer illustrated schematically in Fig. 1 discloses some important properties of this basic circuit. It is apparent from the properties of a hybrid, as expressed by Equations 1 and 2, that transmission from the input 106 to the output 108 takes place by way of two paths. One path, directly through the hybrid, furnishes the portion $$\frac{E_1}{\sqrt{2}}$$

of the output voltage while the other path via 104, 102 and 110 furnishes the portion $$\frac{E_2}{\sqrt{2}}$$

The relative phase of the two portions determines the over-all result. We have shown that $$\frac{E_4}{E_1}$$

has an amplitude of unity for all phases of the loop path when the loop is lossless, i. e., does not involve substantial energy dissipation, but that the rate of change of phase of $$\frac{E_4}{E_1}$$

has maxima and minima as $\theta$ is varied either by changing $f$ or $l$.

The circuit has an apparent multiplying characteristic in that the apparent maximum length of the total transmission path from the input terminal to the output terminal of the hybrid junction 100 is 5.82 times the electrical length of the "loop" connecting the left and the lower terminals. The multiplying effect occurs in other ways as well. For instance, if device 102 is made an attenuator with a 3-decibel loss and $\cos\theta = -1$, the loss from the input terminal to the output terminal will be infinite, and all the power introduced will be absorbed by the attenuator.

When $\cos\theta = +1$, the loss between the input and output terminal of Fig. 1 with the attenuator adjusted for a 3-decibel loss will be 0.4 decibel. This suggests the use of the modified device as a wave meter.

Fig. 3 illustrates, in schematic diagram form, the modification of the arrangement of Fig. 1 for use as a wave meter. 302 is a 3-decibel attenuator (assuming the other components to be free from attenuation), 304 is an adjustable phase shifter, and 306 is an indicator. (Appropriate coaxial and wave-guide attenuators of numerous types are well-known to those skilled in the art. See for example Patent 1,957,538 granted May 8, 1934, to A. G. Jensen; 2,151,157 granted March 17, 1939, to S. A. Schelkunoff; 2,197,123 granted April 16, 1940, to A. P. King and Reissue Patent 20,859 granted September 13, 1938, to R. K. Potter.)

The total value of $\theta$ depends, of course, upon the phase shift in lines 310, 312 and 314 and attenuator 302 plus the phase shift introduced by phase shifter 304. The total attenuation, of course, also includes the attenuation of the other elements of the loop circuit as well as that of the attenuator itself. If, therefore, the connecting lines 310, 312 and 314 are fixed in length and the attenuation of the entire loop including devices 302 and 304 is just 3 decibels, then the frequency of infinite attenuation can be controlled by the phase shifter 304 which can then be calibrated in terms of frequency. The indicator 306 serves to show when the output is substantially zero.

The phase shift $\theta$ is obviously a function of frequency and will vary faster with frequency in proportion as the total length of the lines 310, 312, and 314 is increased, so that for long lines the device is very sensitive with respect to frequency changes, while for short lines it is less sensitive. On the other hand the response is multivalued if the lines are made relatively long, in that if the frequency is changed sufficiently from a given value so that the total line length changes by one wavelength, a duplicate response is obtained. In wave-meter service it is therefore necessary either to confine the frequency band of interest to the region of one predetermined definitely known minimum response, or to use "coarse" and "fine" wave meters, the "coarse" wave meter having relatively short interconnecting lines and being employed to identify the exact response being observed, and the "fine" wave meter having relatively long interconnecting lines and providing the desired degree of accuracy.

The circuit discussed as a wave meter can also obviously be employed as a wave trap with a very high attenuation at one frequency, and relatively small attenuation over a wide band of frequencies. Also, obviously, several units can be used in tandem to provide a wider band of high attenuation by "staggering the peaks," i. e., by spacing the frequencies of high attenuation of the several units at appropriate intervals throughout the band of frequencies to be attenuated, this use being similar to the use of several delay equalizers with "staggered maxima" to obtain more complex delay characteristics.

The Formula 4 from which the performance of the hybrid structure with a loop circuit of the general type illustrated in Figs. 1 to 4, inclusive, has been determined, applies when the path around the loop is matched, i. e., when there are no reflections arising from impedance mismatching in the loop path.

In other words, at all points of juncture between sections of transmission lines and other apparatus units employed in the combinations of structure of the invention the impedance "looking either way" from each juncture point should be the same.

Fig. 5 illustrates one simple structural form for which Fig. 1 can serve as a schematic diagram except that no provision is made for adjusting the phase of the loop circuit which in Fig. 5, of course, comprises simply the loop of wave guide 502. The hybrid junction 500 is the familiar wave-guide "magic T" shown, for example, in Fig. 6 of my above-mentioned copending parent application and described therein. Adjustment of phase in the case of Fig. 5 can, however, be effected by substituting wave-guide loops of lengths differing from that of loop 502 until a loop having the desired phase shift is obtained.

Figure 6:
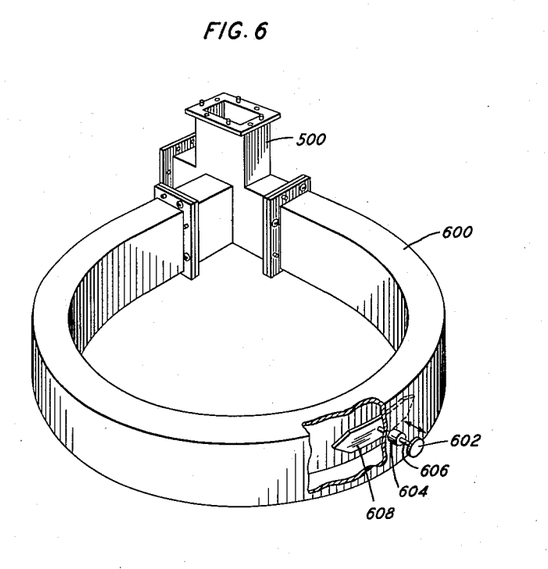

Fig. 6 illustrates the further step over Fig. 5 of including a variable phase shift adjustment in the wave-guide loop 600. Adjustment is effected by increasing or decreasing the separation between member 608 and the side of loop 600 by means of knob 602 and rod 606. A bushing 604 is preferably provided and fastened to the loop 600 to serve as a guide for rod 606 to slide in. The principles and construction of such an adjustable phase shifter are explained in my copending application Serial No. 640,495, now abandoned, mentioned above. Hybrid structure 500 can again be of the above-mentioned wave-guide "magic T" type.

Figure 7:
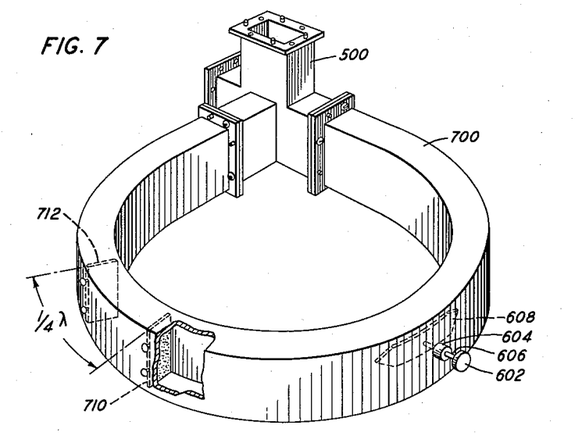

Fig. 7 illustrates an additional feature comprising the incorporation of attenuation in the wave-guide loop 700. Adjustment of phase is effected as for the arrangement of Fig. 6, described above, like parts of the phase adjusting structure being given like numbers in the two figures. Attenuation is effected by the simple arrangement disclosed in Fig. 5 and 5A of the Schelkunoff Patent 2,151,157, mentioned above, which comprises inserting in the wave-guide loop 700 two partitions of restrictive material 710 and 712, spaced one-quarter wavelength apart as taught by Schelkunoff. In accordance with applicant's discussion of Fig. 3 of the present application given above, the total attenuation of the loop structure 700, including members 710, and 712, should be 3 decibels. When so proportioned the structure of Fig. 7 can be employed as a wave meter as described for schematic diagram Fig. 3, the energy whose frequency is to be measured being applied to either of the free terminals of the hybrid junction 500 of Fig. 7 and a meter being connected to the other free terminal to indicate when the output has dropped substantially to zero. A suitable type of meter is, for example, the well-known combination of a crystal detector and meter connected to read the crystal current.

Figure 8:
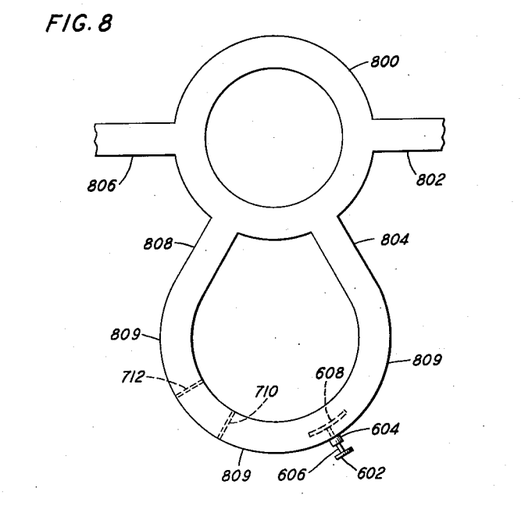

In Fig. 8 a structure of the invention equivalent to that just described above in connection with Fig. 7 is shown. Fig. 8 differs from Fig. 7 in that the "magic T" type of hybrid junction is replaced by the "rat-race" type of wave-guide ring hybrid junction 800. A wave-guide ring hybrid junction is shown, for example, in Fig. 7 of my above-mentioned copending parent application, where it bears the designation number 700. Reference may be had to an article entitled "Hybrid Circuits for Microwaves" by W. A. Tyrrell, published in the November 1947 issue of the proceedings of the I. R. E., for detailed descriptions of "magic T" and wave-guide ring hybrid junctions.

In Fig. 8 the wave-guide loop 809 including attenuating members 710, 712 and phase adjusting members 602, 604, 606 and 608 can be substantially identical to the correspondingly numbered parts as shown in Fig. 7 of the present application and described in detail above. The curvature of the wave-guide loop 809 will be slightly altered so that it can be connected between the non-conjugately related terminals 804 and 808 of the wave-guide ring 800. Either of the remaining two terminals 802, 806 can then be utilized as an input terminal and the other of these two terminals then becomes the output terminal. The over-all structure of Fig. 8 is obviously of the same general character as that of Fig. 7 and can be used in the same manner for substantially the same purposes.

Figure 9:
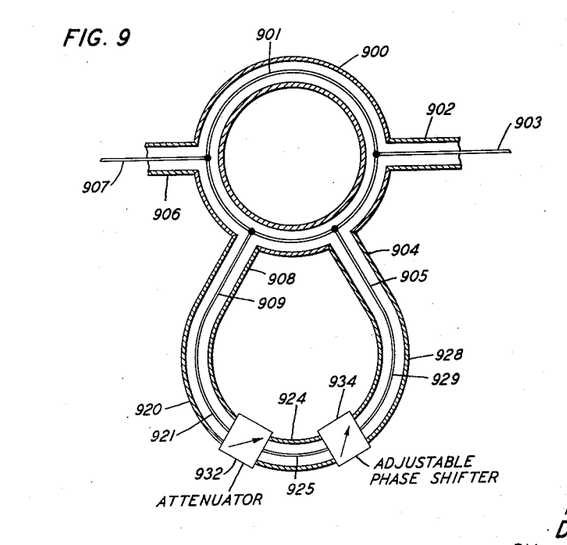

In Fig. 9 a structure of the invention constructed of coaxial line parts is shown. As stated in my parent application, suitable types of coaxial line hybrid rings are disclosed and described in an application of W. A. Tyrrell Serial No. 470,810 filed December 31, 1942, which matured into United States Patent 2,445,895 granted July 27, 1948.

The coaxial hybrid ring comprises outer conductor 900 and inner conductor 901, forming the ring itself, with four terminal connections comprising the outer and inner conductors of the coaxial stub lines 902, 903; 904, 905; 906, 907 and 908, 909, respectively connecting to the ring as shown in Fig. 9.

A loop circuit of coaxial line structure comprising a coaxial line type attenuator 932, and a variable coaxial line type phase shifter 934, with interconnecting sections of coaxial line having inner and outer conductors, 920, 921; 924, 925; and 928, 929, respectively, is connected between the non-conjugately related terminals 904, 905 and 908, 909, as shown in Fig. 9. The above-mentioned reissue patent to R. K. Potter discloses and describes a number of suitable coaxial line attenuators, and United States Patent 2,097,519, granted November 2, 1937, to Gabriel and Rodwin, discloses and describes a variable coaxial line type "tuner" which can be used as a variable phase shifter. Alternatively, the phase can be adjusted by adjusting the effective length of the coaxial line loop by a "trombone slide" type of arrangement wherein the inner and outer conductors of one section of the loop are arranged to slide over the corresponding conductors of the other section of the loop adjacent thereto.

The combination of structure shown in Fig. 9, as just described above, is obviously the coaxial line counterpart of the wave-guide structures shown in Figs. 7 and 8 and described above. It can be used, obviously, for the same purpose as the structures of Figs. 7 and 8. In general, as is well known to those skilled in the art, coaxial line structures are particularly advantageous for use where the frequency range of interest is intermediate the range in which wave-guide structures of feasible construction and convenient dimensions are available and the range over which lumped-element, relatively low frequency, structures are feasible to construct.

Figure 10:
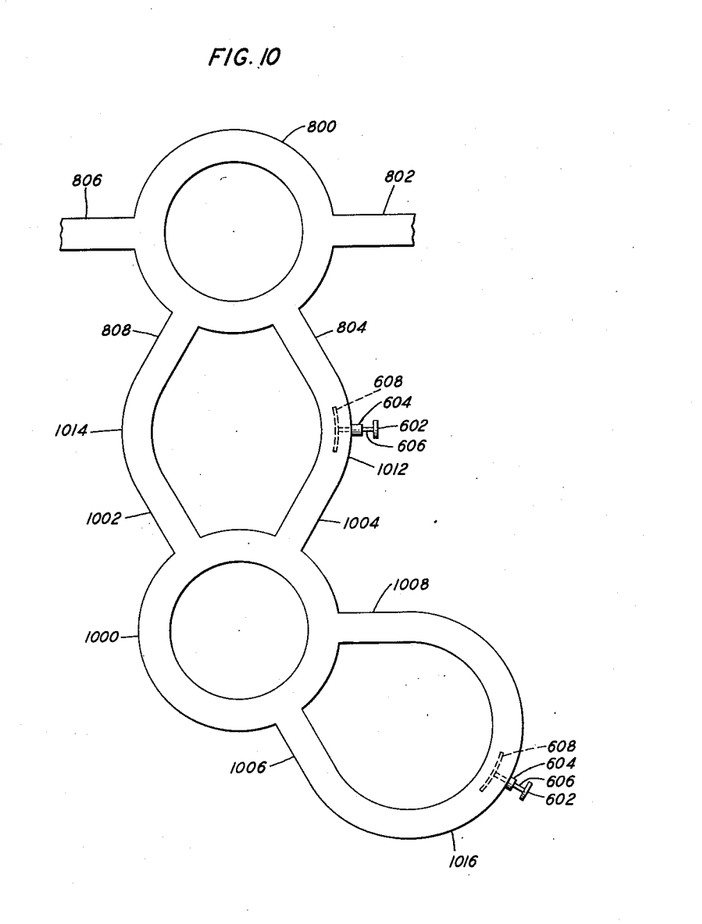

In Fig. 10 a wave-guide structure of the type illustrated by the schematic diagram of Fig. 4 is shown. The wave-guide ring hybrid junction 800, of Fig. 10 has the two non-conjugately related terminals 804 and 808 interconnected by a loop circuit which includes a second wave-guide ring hybrid junction 1000, connections to the latter being made through its terminals (non-conjugately related) 1002, 1004, as shown. The above-mentioned loop circuit also includes sections of wave guide 1014 and 1012, the latter including phase shift adjusting vane 608 and position adjusting members 602, 604 and 606, for vane 608 as described in detail above. Wave-guide section 1014 interconnects terminal 808 of ring 800 and terminal 1002 of ring 1000, as shown, and wave-guide section 1012 interconnects terminals 804 and 1004 of said two rings, respectively, as shown. The other two terminals, 1006 and 1008 (non-conjugately related) of ring 1000, are interconnected by a second wave-guide loop 1016 which also includes a variable phase shifter 602, 604, 606 and 608, described above, as shown.

Obviously, a similar combination of structure to that shown in Fig. 10, except employing "magic T" wave-guide hybrid junctions, would also correspond to the schematic diagram of Fig. 4. Likewise, a coaxial line structure employing two coaxial line hybrid rings and coaxial line sections and phase shifters could readily be constructed, as taught above, to correspond to the schematic diagram of Fig. 4. Obviously, too, the delay introduced by the loop of wave guide in wave-guide structures of the invention can be made adjustable by making one section of the wave-guide loop have a sliding fit over another section so that the effective length of the loop can be readily adjusted within an appropriate range of lengths.

The above-described arrangements are simply illustrative of a few of the many applications of the principles of the invention. Numerous and various other embodiments of the principles of the invention, including low frequency two wire circuits employing conventional low frequency hybrid coils, phase shifters and attenuators, will readily occur to those skilled in the art within the spirit and scope of the invention.

What is claimed is:

1. The combination which comprises an electromagnetic wave, microwave frequency, hybrid structure having four terminals, a first terminal of said structure being conjugately related to a second terminal of said structure, a third terminal of said structure being conjugately related to a fourth terminal of said structure, said first terminal being effectively electrically in series with said third and fourth terminals, said second terminal being effectively electrically in parallel with said third and fourth terminals, and an electromagnetic wave, microwave frequency, impedance structure having an input terminal and an output terminal, said structure being proportioned to manifest predetermined electrical transmission properties between said input and said output terminals, the input terminal of said structure being electrically connected to one of said first-mentioned two terminals of said hybrid structure and the output terminal of said structure being electrically connected to one of said last-mentioned two terminals of said hybrid structure, whereby a predetermined transmission characteristic of said over-all combination between the other of said first-mentioned two terminals of said hybrid structure and the other of said last-mentioned two terminals of said hybrid structure is obtained.

2. The combination of claim 1 in which the said electromagnetic wave, microwave frequency, impedance structure comprises a loop of wave-guide transmission line having a predetermined phase shift.

3. The combination of claim 1 in which the said electromagnetic wave, microwave frequency, impedance structure is a combination of microwave frequency transmission lines and a microwave frequency impedance device.

4. A four-terminal electromagnetic wave, guided wave frequency range hybrid junction and a guided wave frequency range transmission circuit having predetermined phase characteristics electrically interconnecting two terminals of said junction, which two terminals are non-conjugately related, whereby a predetermined transmission characteristic of said over-all structure between the two other terminals of said hybrid junction is obtained.

5. The arrangement of claim 4 in which said transmission circuit has a predetermined attenuation characteristic.

6. The arrangement of claim 4 in which said transmission circuit includes means for adjusting the phase introduced by said circuit.

7. The arrangement of claim 4 in which said transmission circuit includes means for adjusting the phase and means for fixing the attenuation of said circuit at a predetermined value.

8. In combination, an electromagnetic wave, high frequency, four-terminal, wave-guide hybrid junction and a loop of wave-guide transmission line having predetermined electrical transmission properties, said line being electrically interconnected between two non-conjugately related terminals of said junction, whereby a predetermined transmission characteristic between the other two terminals of said hybrid junction is obtained.

9. The combination of claim 8, said loop of wave guide including phase adjusting means.

10. The combination of claim 8, said loop of wave guide including phase adjusting means and attenuating means.

11. The combination of claim 8, said loop of wave guide including phase adjusting means, the impedances of the ends of the loop being matched to those of the hybrid junction terminals to which its ends are connected, respectively.

12. The combination of claim 8, said loop of wave guide including phase adjusting means, said phase adjusting means being proportioned and arranged to introduce no impedance irregularities in said loop.

13. The combination of claim 8, said loop of wave guide including phase adjusting means and attenuating means, both of said means being proportioned and arranged to introduce no impedance irregularities in said loop.

14. A plurality of electromagnetic wave, guided wave frequency range, hybrid junctions, a like plurality of guided wave frequency range transmission circuits each including an adjustable phase structure therein, each of said transmission circuits being adjustable with respect to its phase over a particular predetermined range and being associated with a particular one of said plurality of junctions and electrically connecting two non-conjugately related terminals of its associated junction, all of said hybrid junctions being connected electrically in tandem, whereby a predetermined complex transmission characteristic can be imparted to the over-all assembly of structure.

15. In combination, a first electromagnetic wave, four-terminal, guided wave frequency range, hybrid junction, a second electromagnetic wave, four-terminal, guided wave frequency range hybrid junction, a first electromagnetic wave, guided wave frequency range, transmission circuit including an adjustable phase structure therein and electrically connected to two non-conjugately related terminals of said first junction and a second electromagnetic wave, guided wave frequency range, transmission circuit including an adjustable phase structure therein, said second transmission circuit electrically connecting the remaining two terminals of said first junction to two non-conjugately related terminals of the second junction, respectively, said first and said second transmission circuits being adjustable with respect to phase over particular predetermined ranges which are at least in part non-coincident, whereby any of a large number of different predetermined complex transmission characteristics can be imparted to the over-all assembly of structure when either of the two free terminals of said second junction is employed as an input terminal and the remaining free terminal of said second junction is employed as an output terminal.

16. The combination defined in claim 14 in which each of said like plurality of guided wave frequency range transmission circuits has the same phase shift.

17. The combination defined in claim 14 in which each of said like plurality of guided wave frequency range transmission circuits has a different phase shift.

18. In an electromagnetic wave transmission circuit, the combination which comprises an electromagnetic wave hybrid structure having two pairs of terminals, the terminals of each pair being conjugately related with respect to each other and an electrical circuit having a predetermined phase-shift characteristic electrically interconnecting one terminal of one of said pairs with one terminal of the other of said pairs, whereby a predetermined transmission characteristic is imparted to the combined structure, between the free terminal of one pair and the free terminal of the other pair of terminals of said hybrid structure.

19. The combination of claim 18 in which said electrical circuit also has a predetermined attenuation.

20. The combination of claim 19 and means for adjusting the phase shift of said electrical circuit.

DOUGLAS H. RING.

References Cited in the file of this patent

UNITED STATES PATENTS

| Number | Name | Date |
|---|---|---|
| 2,445,895 | Tyrrell | July 27, 1948 |